Figure 1:
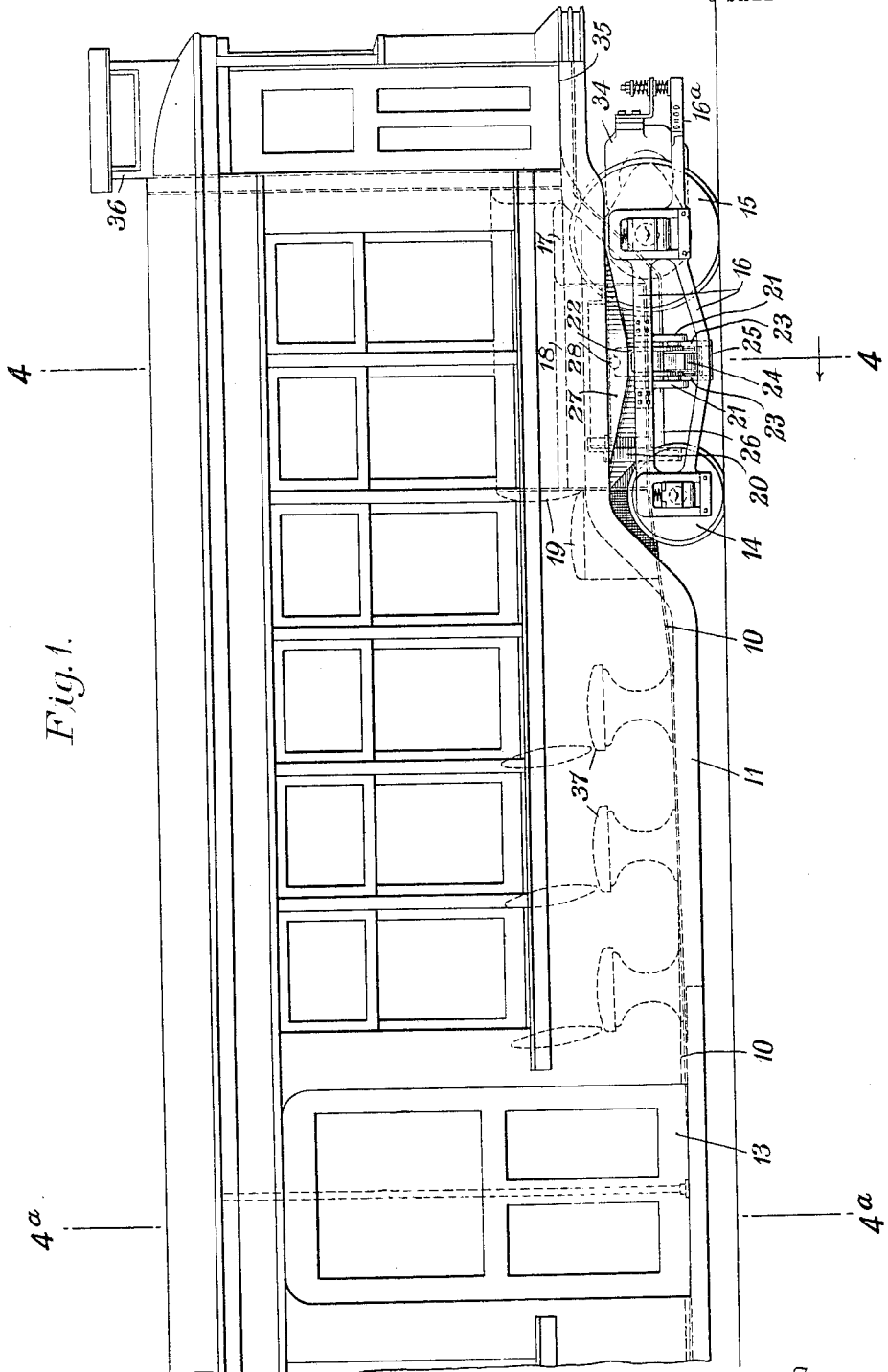

F. HEDLEY & J. S. DOYLE.
STREET CAR.
APPLICATION FILED MAR. 1, 1912.

1,085,255.

Patented Jan. 27, 1914.
5 SHEETS—SHEET 1.

Witnesses:
C. L. Belcher
A. S. Fowler

Inventors
Frank Hedley
James S. Doyle
by Edward A. Wright. Atty.

F. HEDLEY & J. S. DOYLE.
STREET CAR.
APPLICATION FILED MAR. 1, 1912.

1,085,255.

Patented Jan. 27, 1914
5 SHEETS—SHEET 5.

Witnesses:
C. L. Belcher
A. S. Fowler

Inventors
Frank Hedley
James S. Doyle
by Edward Wright Atty.

UNITED STATES PATENT OFFICE.

FRANK HEDLEY, OF YONKERS, AND JAMES S. DOYLE, OF MOUNT VERNON, NEW YORK.

STREET-CAR.

1,085,255. Specification of Letters Patent. Patented Jan. 27, 1914.

Application filed March 1, 1912. Serial No. 680,828.

*To all whom it may concern:*

Be it known that we, FRANK HEDLEY and JAMES S. DOYLE, both citizens of the United States, residing, respectively, at Yonkers and Mount Vernon, in the county of Westchester and State of New York, have invented a certain new and useful Improvement in Street-Cars, of which the following is a specification.

This invention relates to street cars of a motor driven type, and has for its main object to greatly increase the convenience and comfort of passengers in getting on and off from cars by providing a substantially continuous low level floor within a single stepping distance above the street level or top of rail. Electric cars of this type, as now in common use, are usually provided with motor trucks having wheels about thirty inches in diameter, and the floor level is raised to clear the tops of the wheels, thereby necessitating at least two, and sometimes three high steps from the street level to the floor of the car. This has made it very difficult for passengers, especially elderly persons, to readily get on and off from cars, and furthermore, these high steps have contributed an element of danger since accidents are very liable to occur, and often do happen, due to passengers slipping or falling upon the steps.

By means of our improvement, these difficulties are avoided, as the dangerous steps are dispensed with, and passengers may readily step directly from the street surface into the car upon the continuous low level floor, and without climbing any further steps, pass to any of the seats in the car.

Another feature of our improvement relates to the construction of the trucks, and to the arrangement of car seats, whereby the continuous low level floor may be extended over said trucks, and clearance space for the swiveling movement of the truck wheels be provided beneath the car seats, so that the seating capacity is not materially reduced, nor indeed diminished at all, as compared with the present standard construction of street cars of the corresponding lengths.

Another feature of our improvement relates to the center side door construction, in connection with the continuous low level floor whereby passengers may, with a single step, pass directly from the street into the middle portion of the car.

Another feature relates to the provision of the motorman's cab located at the end of the car over the truck motors, and at a higher level than the low level floor.

These and other features will hereinafter more fully appear from the following description of one form of street car, showing our invention.

Figure 2:
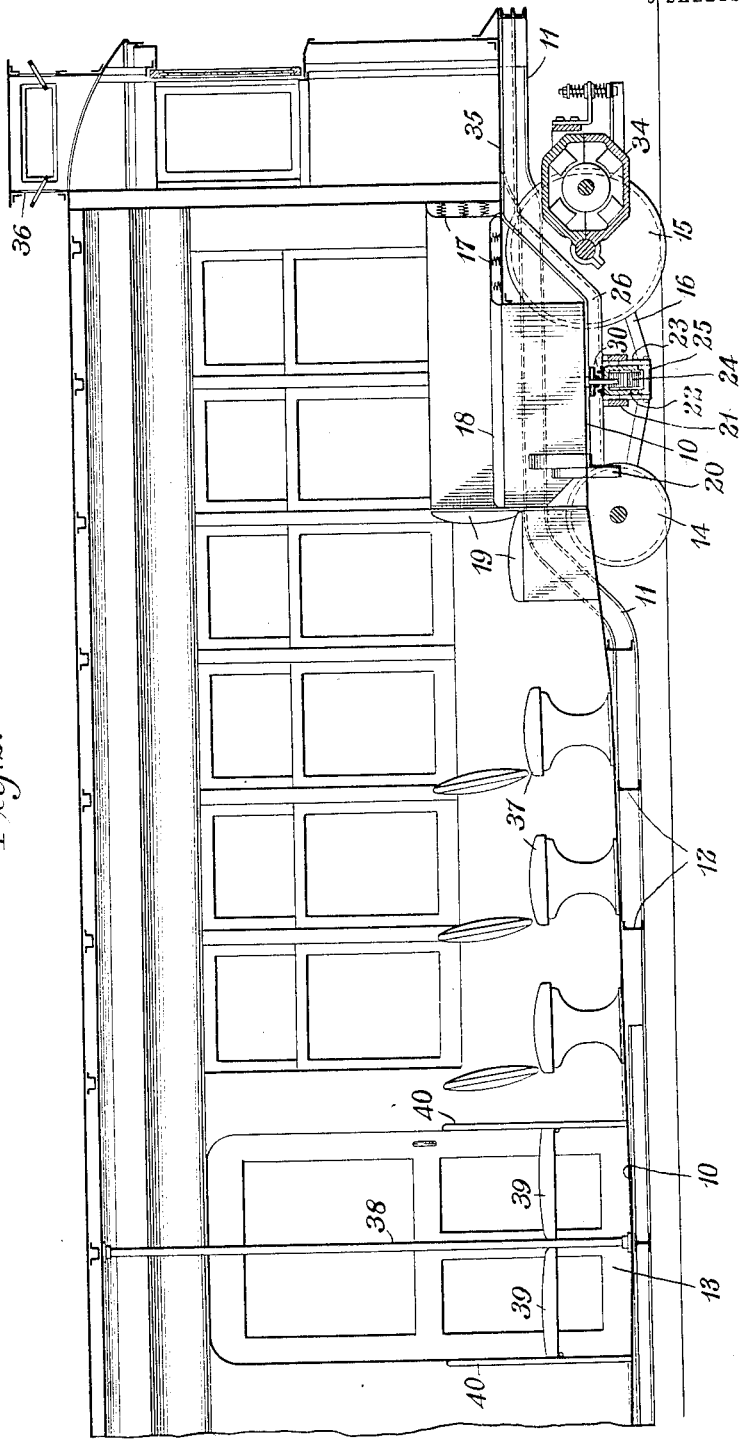
Figure 3:
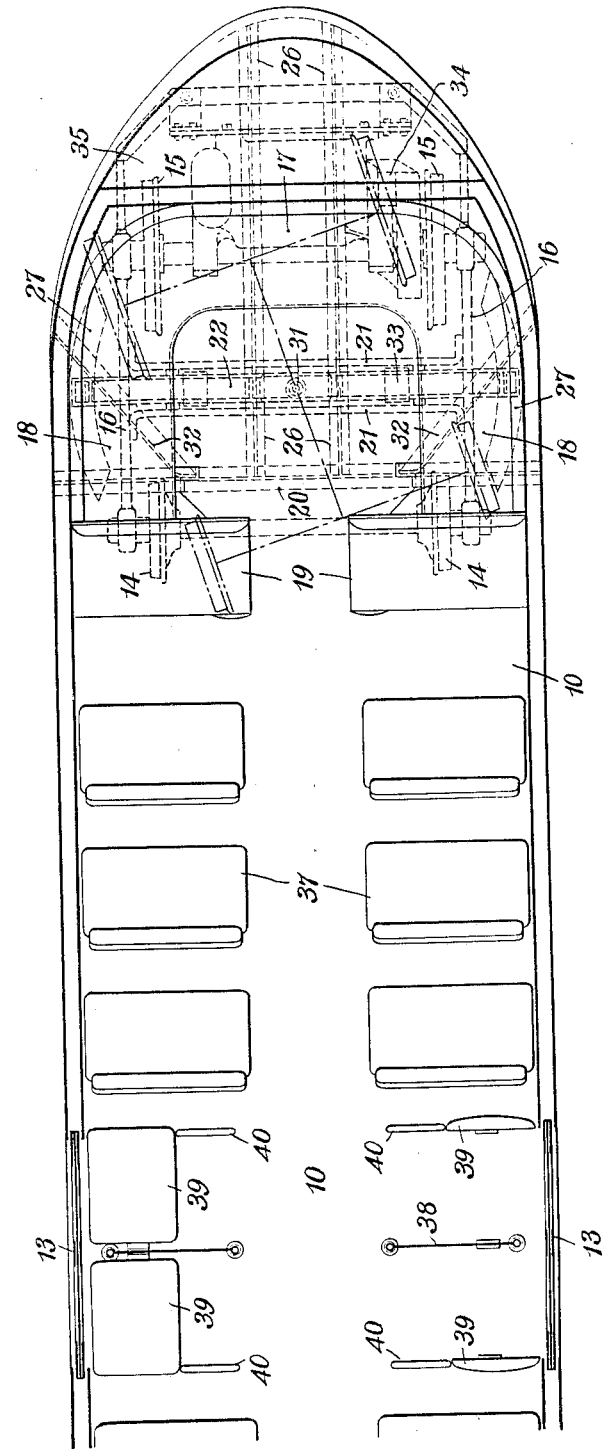
Figure 4:
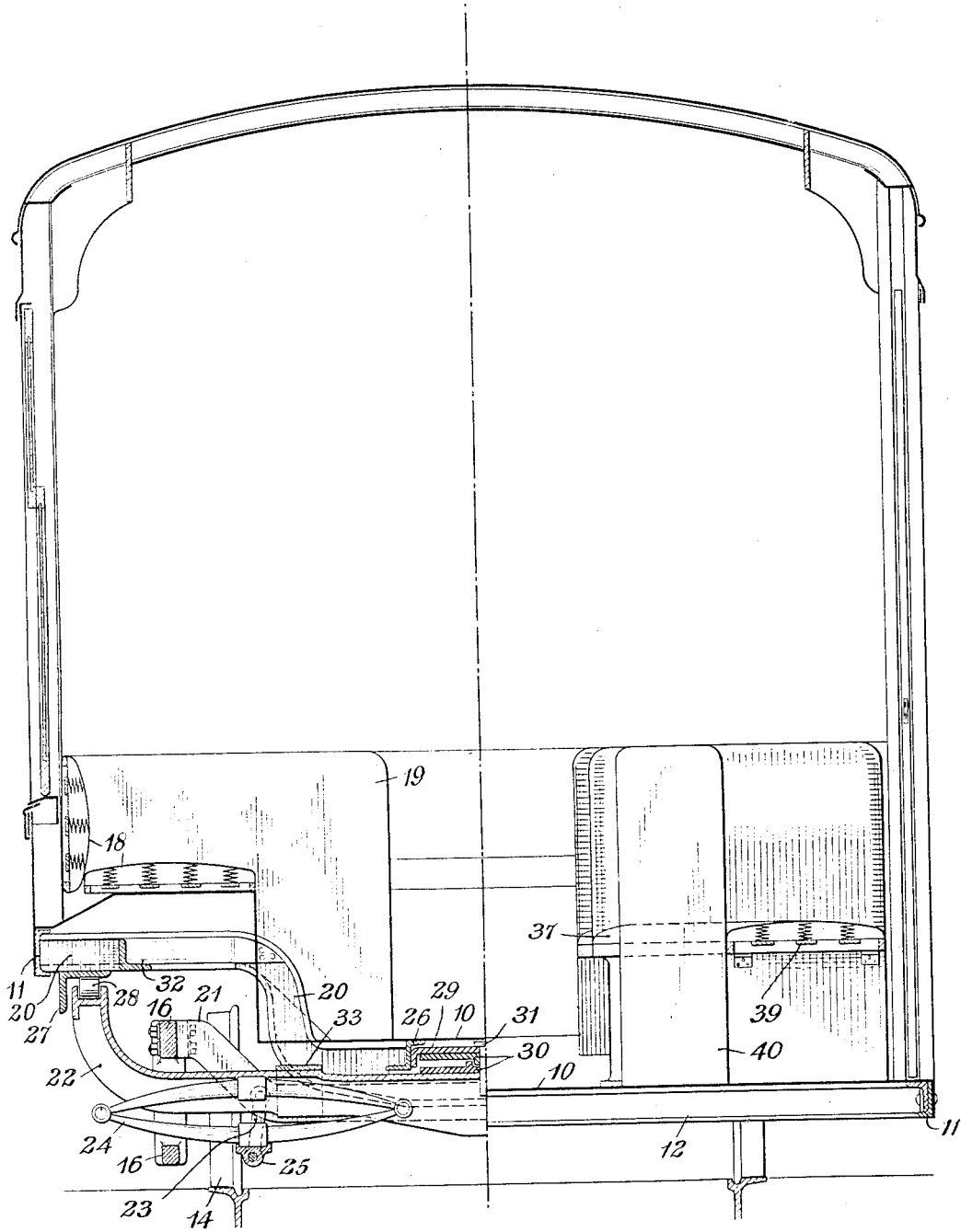
Figure 5:
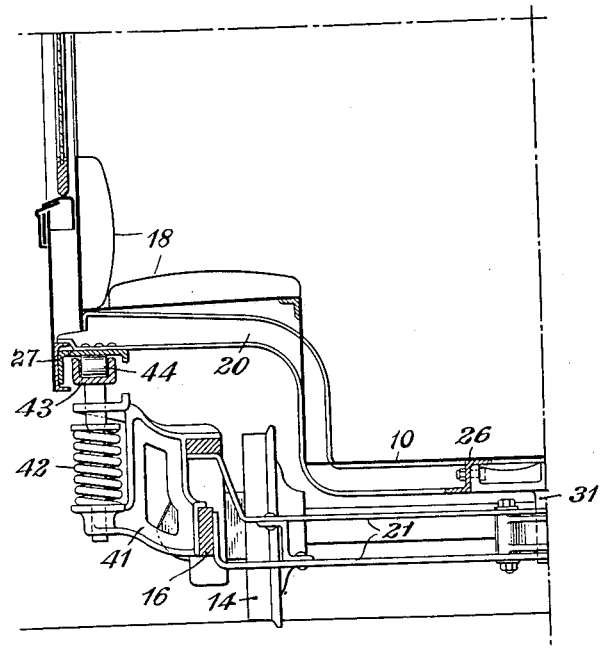

In the accompanying drawings: Figure 1 is a side elevation of one half of a street car embodying our improvement; Fig. 2, a vertical longitudinal section of the same; Fig. 3, a horizontal section showing one arrangement of seats for providing clearance space beneath the same for the swiveling movement of the truck, the truck being indicated in dotted lines and the position of the wheels in the swiveling action being indicated in dotted and dash lines; Fig. 4, a transverse section, one half being taken on the line 4—4, and the other half on the line 4ª—4ª of Fig. 1; Fig. 5, a transverse section of one half of a car showing a slightly modified form of truck and side bearing support; and Fig. 6, a side view of the form of truck shown in Fig. 5.

According to the principal feature of our improvement the car is provided with a substantially continuous low level floor, 10, located within a single stepping distance above the street surface or top of rail, as clearly shown in Figs. 1, 2, and 4 of the drawings, and extending throughout the seating space and over the middle portion of the trucks at the ends of the car. If preferred, the floor may rise upon a very slight incline toward the ends of the car, in order to more easily clear the axles of some of the truck wheels, but such rise is so gradual as to be scarcely noticeable to a passenger walking from the center to the end seats of the car, and the floor may be said to be substantially continuous as a low level floor, the important feature being that a person may easily mount from the street surface to the floor of the car with a single step, and easily walk at substantially the same level to reach any or all seats in the car without climbing any steps.

Various forms of car trucks and floor frame work construction may be designed to carry out the main object of our improvement, and while we have shown one particular design of car for this purpose, it is understood that our invention is not limited to such specific construction.

As shown in the drawings, we have illustrated our invention as applied in connection with a car having a center door, 13, and a pivoted motor truck of the so-called "maximum traction" type at each end of the car. The low level floor, 10, extends toward the end of the car over the axle of the smaller wheels, 14, and over the center pivot of the truck, and the seats are arranged to provide clearance for the swiveling movement of the truck in passing around curves in the track. For this purpose, a cross seat, 17, is located at the end of the seating space of the car over the axle of the large truck wheels, 15, and said seat may be extended at 18, around on the two sides of the car to two transverse seats, 19, located over the small wheels, 14, so as to provide sufficient space beneath said seats in which said wheels may turn freely in the swiveling movement without interfering with the low level floor and frame work, as fully shown in Fig. 3.

For supporting the floor, 10, the car body may be constructed with side sills, 11, located at the level of the floor throughout the body portion of the car, and bent upward over the trucks and around the end of the car as shown, the floor beams, 12, for carrying the floor being supported on the side sills. The frame work is preferably formed of steel or other metal, although any suitable material may be employed.

In order to provide for the low level floor between the seats toward the ends of the car and over the axles and center plates of the trucks, the body bolster, 20, may be attached at its ends to the side sills, 11, and bent downward beneath the floor at its middle portion as shown more clearly in Fig. 4. This body bolster is so shaped and located as not to interfere with the swiveling movement of the truck, and is connected with the longitudinal bars, 26, which carry the plate, 29, supported on the center plates, 30, having pivot pin, 31, the bars, 26, being then bent upward and attached to the car sills at the end of the car, as shown in Figs. 2 and 3.

According to the construction of truck shown in Figs. 1 to 4, which is of the center bearing type, the transverse transoms, 21, are bolted to the side frames, 16, and may be bent down or depressed at the middle portion to pass beneath the longitudinal bars, 26. The center plates, 30, rest upon the truck bolster, 22, which is preferably of an inverted U shape metal section located between the transoms, 21, and supported in turn upon the springs, 24, which are suspended from the transoms by means of hangers, 23, and block, 25. A chafing plate, 33, may be mounted on the truck bolster, and provided with depending flanges extending down between the transoms and the sides of the bolster in which space the hangers are located.

For the purpose of supporting or steadying the car body at its sides, the truck bolster, 22, may be extended through an opening in the side frames, 16, and have its ends bent upward and adapted to carry a roller, 28, on which bears the curved bar, 27, carried by the frame work of the car body. As shown in Figs. 3 and 4, a brace, 32, extends between the side sills, 11, and the body bolster, 20, and the curved bar, 27, is supported upon these members. By means of this construction, the parts of the truck and frame work are located at a low elevation, which permits the extension of the low level floor over the trucks to the end seats, while at the same time providing ample clearance for the swiveling movement of the truck in passing around curves. The side frame of the truck has an extension, 16ª, for supporting the electric motor, 34, at the end of the car for driving the axle of the larger wheels, 15, in the usual way.

The motorman's cab may be located at the extreme end of the car beyond the end seat, 17, and its floor, 35, is at a higher elevation than the low level floor, 10, in order to clear the motor and large wheels of the truck. If desired, the cab may be entirely separated from the main seating portion of the car by means of a partition at the back of the end seat, 17, and it may also be provided with a ventilator, 36, extending above the roof of the main body of the car. Throughout the main portion of the car, between the transverse seats, 19, and the center door, transverse seats, 37, may be employed or any other suitable or preferred seating arrangement may be used. At the center side doors, the barriers, 38, may be located in order to facilitate the loading and unloading of passengers, and drop seats, 39, are provided which may be raised upon the side where the door is in use, and lowered upon the side where the door remains closed. These seats, 39, may be mounted on short barriers, 40, forming one side of an aisle leading to the door, when the drop seats are raised.

It is important that the seating capacity of the car should not be materially reduced from that of standard design of cars of corresponding lengths, as heretofore used, and this desired result is obtained with our improved seating arrangement, whereby the low level floor may extend to the end seat, and the space beneath the seats furnish the necessary clearance for the swiveling movement of the truck wheels.

Figure 6:
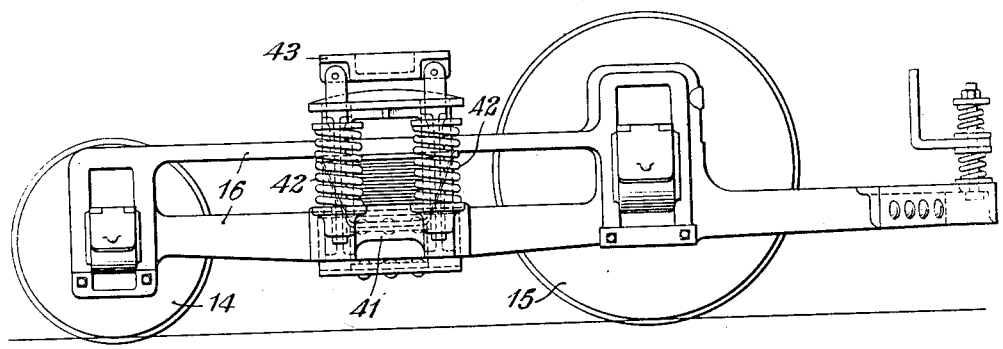

Figs. 5 and 6 show a slightly modified form of truck of the so-called side bearing type, in which the truck bolster is eliminated and the side frames, 16, are provided with brackets, 41, carrying springs, 42, for supporting the side bearing blocks, 43, and rollers, 44, on which rest the curved bearing bars, 27, of the car body. In this form of construction the truck transom 21, and the center plate connections may be made much lighter as the main portion of the weight of the car is carried at the side bearings.

It will be evident that if the sides of the car are made so as to be removable, it may be converted into an open type of car, in which case transverse seats may be placed throughout the intermediate portion, and passengers would then be able to step into the car at any of these seats by a single step from the street level. If a partition is inserted between the end of the seating space and the motorman's cab, as shown, it will be apparent that the same may be provided with windows which may be lowered to make a semi-convertible car, and a door for giving access to the cab may be also located in the partition, if desired, but in either case, an independent outside door at the front or side of the motorman's cab should be provided, as shown in the drawings. The space within the cab may also be utilized for placing the control apparatus, motor compressors and other accessories, thereby economizing space.

Having now described our invention, what we claim as new and desire to secure by Letters Patent, is:—

1. A street car having a pivoted truck at each end for double rail tracks, a low level floor within a single stepping distance of the street and extending over the trucks, and car seats having clearance space beneath the same, for the swiveling movement of the truck wheels.

2. A street car having pivoted motor trucks at its ends for double rail tracks, a low level floor within a single stepping distance of the street and extending over the trucks, center side doors, and car seats having space beneath same for the swiveling movement of the truck wheels.

3. A street car having pivoted motor trucks at its ends for double rail tracks, a substantially continuous low level floor within a single stepping distance of the street level and extending over the center pivot of said trucks, and car seats having clearance space beneath the same for the swiveling movement of the truck wheels.

4. A street car having pivoted motor trucks at its ends for double rail tracks, a substantially continuous low level floor within a single stepping distance of the street level and extending over said trucks, and transverse car seats near the end of the car with clearance space beneath said seats for the swiveling movement of the truck wheels.

5. In a street car, the combination with a car body having a substantially continuous low level floor within a single stepping distance of the street, and a body bolster provided with a depressed portion passing beneath said floor, of a pivoted truck having a depressed transom.

6. In a street car, the combination with a car body having a substantially continuous low level floor within a single stepping distance of the street and extending over the middle portion of the trucks, of seats having clearance space beneath the same, a body bolster provided with a depressed portion passing beneath said floor, and a pivoted truck with wheels extending into said clearance space beneath the car seats.

7. In a street car, the combination with a pivoted truck having a transverse member carrying a center plate, of a car body having a substantially continuous low level floor within a single stepping distance of the street and extending over the middle portion of the truck, a body bolster having a depressed portion passing beneath the car floor, and longitudinal bars connected to the body bolster and extending over the transverse member of the truck.

8. In a street car, the combination with a pivoted truck having side frames, transom, and a bolster extending beyond the side frames at its ends to form side bearings for the car body, of a car body having a substantially continuous low level floor within a single stepping distance of the street and extending over the truck, and a body bolster having a depressed portion passing beneath the low level floor.

9. In a street car, the combination with a pivoted truck having side frames, a depressed transom, and a spring supported truck bolster, of a car body having a substantially continuous low level floor within a single stepping distance of the street and extending over the middle portion of the truck, a body bolster having a depressed portion passing beneath the low level floor, and car seats having space beneath the same for the swiveling movement of the truck wheels.

10. In a street car for double rail tracks, the combination with a swiveled truck having wheels and an axle, a substantially continuous low level floor within a single stepping distance of the street and extending over said axles, car seats having a clearance space beneath them to accommodate the truck wheels during the swiveling movement of the truck, and a motorman's cab with a floor at a higher level at the end of the car.

11. In a street car for double rail tracks, the combination of a swiveled motor truck at the end of the car, a substantially continuous low level floor within a single stepping distance of the street and extending over said truck, car seats having a clearance space beneath them to accommodate the truck wheels during the swiveling movement of the truck, and a motorman's cab with a floor at a higher level extending over the motor of the truck at the end of the car.

12. In a street car for double rail tracks, the combination of a pivoted motor truck at its end, a substantially continuous low level floor within a single stepping distance of the street and extending over the middle portion of the truck, car seats having a clearance space beneath the same for the swiveling movement of the truck wheels, and a motorman's cab with a floor at a higher level extending over the motor of the truck at the end of the car.

13. A street car having pivoted motor trucks at its ends, a substantially continuous low level floor within a single stepping distance of the street and extending over the middle portion of the trucks, side sills extending at a high level over the trucks and depressed to the low level floor between the trucks, and a body bolster connected at its ends to the high level portion of the side sills over the truck, and depressed at its middle portion to pass beneath the low level floor.

14. A street car having pivoted motor trucks at its ends, a substantially continuous low level floor within a single stepping distance of the street and extending over the middle portion of the trucks, side sills extending at a high level over the trucks at the end of the car and depressed to the low level floor between the trucks, and a motorman's cab with its floor at the high level of the side sills at the end of the car.

15. A car truck, a transversely extending car body bolster supported at its ends by the truck, said bolster being depressed intermediate its ends to a single step distance from the ground, the car floor being carried by the depressed portion of the bolster.

16. A car having a floor, a supporting truck therefor, said car and truck having transversely extending members depressed intermediate their ends, the car floor being carried by the depressed portion of the car member.

17. A car having a floor, a supporting truck therefor, said car and truck having swively connected transversely extending members depressed intermediate their ends, the car floor being carried by the depressed portion of the car member.

In testimony whereof we have hereunto set our hands.

FRANK HEDLEY.
JAMES S. DOYLE.

Witnesses:
J. C. NORRIS,
C. V. SMITH.